Nov. 17, 1925.

M. L. PASCARELLO

POTTERY MOLD

Filed Feb. 11, 1925

1,562,361

M L Pascarello INVENTOR

BY *Victor J. Evans*
ATTORNEY

WITNESS:

Patented Nov. 17, 1925.

1,562,361

UNITED STATES PATENT OFFICE.

MIKE L. PASCARELLO, OF NEW BRIGHTON, PENNSYLVANIA.

POTTERY MOLD.

Application filed February 11, 1925. Serial No. 8,502.

*To all whom it may concern:*

Be it known that I, MIKE L. PASCARELLO, a citizen of the United States, residing at New Brighton, in the county of Beaver and State of Pennsylvania, have invented new and useful Improvements in Pottery Molds, of which the following is a specification.

My present invention has reference to a pottery mold especially designed for molding flower pots.

In the ordinary construction of molds for flower pots, a male and female die member are employed, one carrying the clay and revolving around the other. The female member has a lipped mouth, while the male member has its headed portion provided with an annular depression to receive the lip therein. The molded pot, between these portions of the dies, is not properly acted on to smooth the same, with the result that the mouths of the pots are rough and in the majority of instances very ragged. It may therefore be considered the object of this invention to provide a pottery mold with means for shaping and smoothing the mouth portions of flower pots.

A further object is to provide either the male or female member of a pottery mold with a cutter in the nature of an annular bead, which may be readily attached to either of the mold members in a manner to permit of its replacement should the same become worn.

A still further object is the provision of means for removing superfluous clay from the mouth portions of a pot formed in the mold and to smoothly round the mouth of the pot, which is characteristic of simplicity in construction, automatic in operation and accurate in producing the desired result.

The drawing which accompanies and forms part of this application illustrates satisfactory embodiments of the improvement as reduced to practice, and wherein:—

Figure 1:
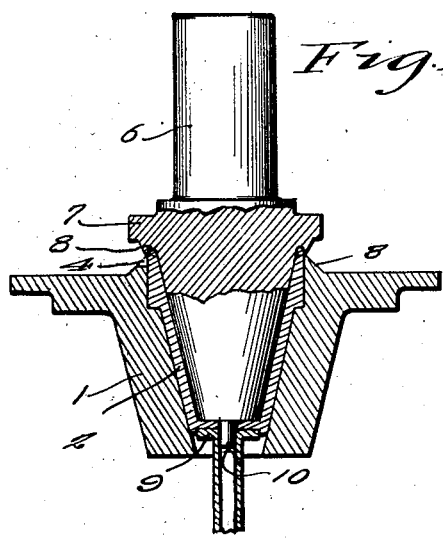
Figure 1 is a sectional view through a mold embodying the improvement.
Figure 2:
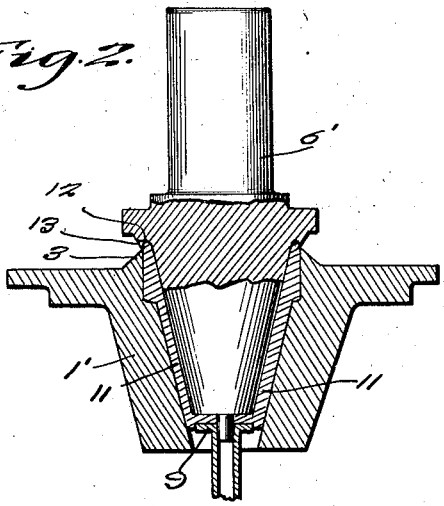
Figure 2 is a view substantially similar to Figure 1, but showing the cutter arranged on the male or punch member of the die.
Figure 3:
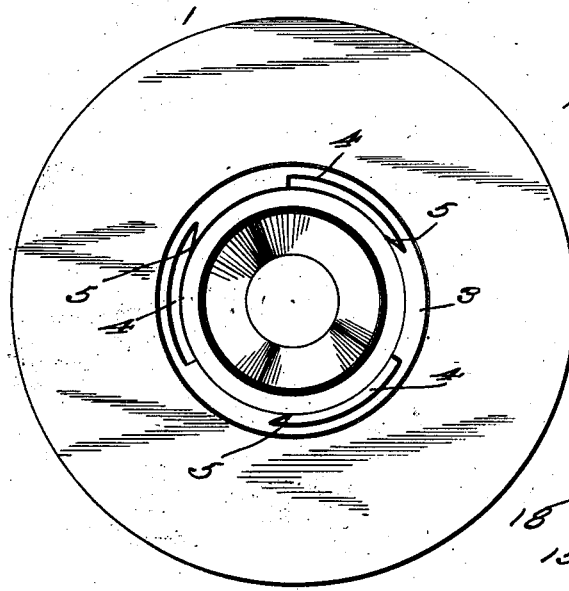
Figure 3 is a top plan view of the female mold member illustrated in Figure 1.
Figure 4:
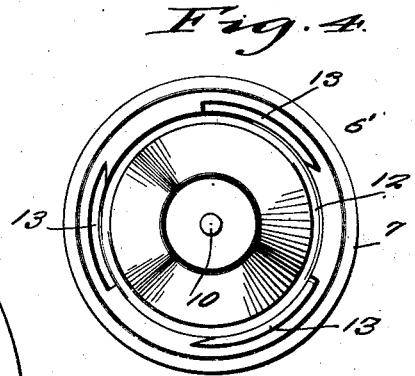
Figure 4 is an inner face view of the male die member or punch.

As is well known in the art, the male member or punch of a mold for pottery carries the clay to revolve the same in the female member when plain flower pots are produced, while in producing flower pots having fancy body portions, the male or punch member is stationary and the female mold member or die carries the clay and revolves the same around the punch. Therefore, it is obvious that my improved cutter must be applied to the stationary element of the mold. The female member of the die for producing plain flower pots is illustrated in detail in Figures 1 and 3 of the drawings and is indicated by the numeral 1. The female mold member for producing flower pots having fancy body portions is illustrated in Figure 2, and while of a similar construction to the member 1, is for distinction indicated by the numeral 1'. The female die members 1 and 1' are provided with the usual conical openings, enlarged and shouldered adjacent to their outer ends, which conform to the exterior shape of the pot 2 to be molded therein. Also each of the members 1 and 1' has its said opening, at the top thereof, surrounded by a bead 3 and 3' respectively. The outer faces of these beads are beveled downwardly, and in the showing of Figures 1 and 3 the said edge of the bead is formed with equi-distantly spaced substantially elongated notches 4, one of the end walls of each of the said notches being cut angularly to provide a sharpened edge 5. In Figure 2, the bead is not notched.

The male mold member, commonly termed the punch, employed in connection with the die 1, is indicated by the numeral 6. This member is susceptible to both vertical and rotary movement in the ordinary manner, so the means for producing these results are not illustrated. The core portion or end of the punch 6 is conical to conform to the shape of the opening in the female die member 1, the said cone-shaped portion being provided with a head 7 whose under face is formed with an annular depression 8, the inner wall of which being rounded, and within this depression the mouth of the pot 1 is to be received. After the clay, from which the pot 2 is formed, is received in the die 1, the same rests on a plunger 9 of the usual construction, the said plunger having its head, and also preferably its body provided with an opening in which is received a round pin extension 10 on the punch 6.

As previously stated, the punch member carries the clay, causing the same to revolve in the die member 1. Surplus clay at the mouth of the pot will be encountered by the knives 5 and will be cut from the said mouth of the pot and forced to one side of the mold. The rounded pin 10, being received in the rounded opening in the plunger 9, provides an effective bearing for centering the male or punch member of the mold, and the construction as above described insures a rounded and even mouth portion on the pot 2. Of course, the male member or punch is raised out of the pot and female die member 1 when the pot is shaped and the pot is ejected by the plunger 9 in the usual manner.

In Figure 2, the female mold member or die 1', as previously stated, carries the clay from which the pot 11 is formed. In this instance, the outer wall of the depression 12 in the head of the punch 6' is formed with spaced depressions 13, one end wall of each depression being beveled to provide a knife edge. In the process of molding the pot, the punch 6' is stationary and the die member 1' revolves. Surplus clay contacting with the knife elements provided by the notches 13 will be removed from the pot so that a pot having a perfectly shaped mouth will be produced.

Figure 5:
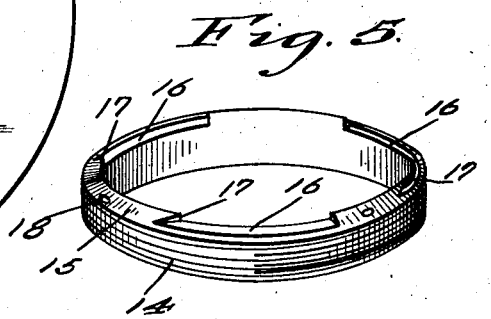
Figure 5 is a perspective view of the removable cutter.

It is desirable that the elements of the pottery mold be provided with cutters which are removably associated therewith, and to this end a construction disclosed in Figure 5 of the drawings is employed. The cutter includes a ring-like body 14 having its outer edge beaded, as at 15. The bead is inclined from its inner to its outer edge, so that its inner edge is sharp. This edge of the bead at equidistantly arranged points thereon is notched, as at 16. The notches are somewhat elongated, and one of the end walls of each of the notches is cut angularly to provide a knife or cutter edge 17. The body 14 has spaced openings 18 therethrough for the reception of means that secure the said body on either the male or female mold members.

The simplicity of my construction and its advantages will, it is thought, be apparent from the foregoing description when taken in connection with the drawings. It is, of course, to be understood that the improvement is constructed in different sizes, that any desired material may be employed in forming the cutters and that such changes as fall within the scope of my claims may be resorted to in the manufacture of the device.

Having described the invention, I claim:—

1. A pottery mold including a male and a female member, and a clay cutter between and carried by one of said members, comprising an annular member whose outer edge is beveled inwardly and provided with equi-distantly spaced notches, and one of the end walls of each notch being cut angularly to provide a cutting edge.

2. A removable cutter for either the male or female member of a pottery mold, comprising an annulus having an inwardly beaded edge provided with equi-distantly spaced elongated notches, one end of each notch being cut angularly to form the same with a cutting edge, and means for removably securing the cutter on the mold.

In testimony whereof I affix my signature.

MIKE L. PASCARELLO.